(12) United States Patent
Flores Renteria

(10) Patent No.: US 12,703,665 B2
(45) Date of Patent: Aug. 11, 2026

(54) CERAMIC MATERIAL, POWDER AND LAYER SYSTEM

(71) Applicant: Siemens Energy Global GmbH & Co. KG, Munich (DE)

(72) Inventor: Arturo Flores Renteria, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 478 days.

(21) Appl. No.: 18/277,072

(22) PCT Filed: Jan. 13, 2022

(86) PCT No.: PCT/EP2022/050634
§ 371 (c)(1),
(2) Date: Aug. 13, 2023

(87) PCT Pub. No.: WO2022/174996
PCT Pub. Date: Aug. 25, 2022

(65) Prior Publication Data
US 2024/0109812 A1 Apr. 4, 2024

(30) Foreign Application Priority Data
Feb. 18, 2021 (DE) ..................... 10 2021 201 565.4

(51) Int. Cl.
*C04B 35/48* (2006.01)
*C04B 35/486* (2006.01)
*C23C 28/04* (2006.01)

(52) U.S. Cl.
CPC .......... *C04B 35/486* (2013.01); *C23C 28/042* (2013.01); *C04B 2235/3217* (2013.01);
(Continued)

(58) Field of Classification Search
CPC ............ C04B 35/486; C04B 35/62222; C04B 2235/3225; C23C 28/042; C23C 28/321; C23C 4/134
See application file for complete search history.

(56) References Cited

U.S. PATENT DOCUMENTS 6,812,176 B1 * 11/2004 Zhu ....................... C04B 35/486 501/103
6,887,595 B1 * 5/2005 Darolia .................. C23C 14/08 427/584
(Continued)

FOREIGN PATENT DOCUMENTS

CN 111836793 A 10/2020
CN 114641594 A 6/2022
(Continued)

OTHER PUBLICATIONS

Chen et al. Microstructure, thermal characteristics, and thermal cycling behavior of the ternary rare earth oxides (La2O3, Gd2O3, and Yb2O3) co-doped YSZ coatings.Surface & Coatings Technology 403 (2020) 126387.*
(Continued)

*Primary Examiner* — Noah S Wiese
(74) *Attorney, Agent, or Firm* — Wolter Van Dyke Davis, PLLC

(57) ABSTRACT

An improved ceramic material for heat insulation is achieved by the following selection of specific stabilizers and the adapted proportions: Base of zirconium dioxide ($ZrO_2$) with: 1.0 wt. % to 9.0 wt. % of base stabilizers: yttrium oxide ($Y_2O_3$), hafnium oxide ($HfO_2$), wherein at least yttrium oxide ($Y_2O_3$) is used, and at least one of the additional stabilizers: erbium oxide ($Er_2O_3$) and/or ytterbium oxide ($Yb_2O_3$) with a proportion of 0.2 wt. % to 20 wt. %.

20 Claims, 1 Drawing Sheet

(52) U.S. Cl.
CPC ................. *C04B 2235/3225* (2013.01); *C04B 2235/3244* (2013.01)

(56) References Cited

U.S. PATENT DOCUMENTS

| | | | | |
|---|---|---|---|---|
| 8,394,484 | B2 * | 3/2013 | Taylor | C23C 4/11 428/338 |
| 2007/0082131 | A1 * | 4/2007 | Doesburg | C23C 14/083 427/454 |
| 2020/0123060 | A1 | 4/2020 | Gries | |
| 2021/0032168 | A1 | 2/2021 | Flores Renteria | |
| 2021/0163363 | A1 | 6/2021 | Flores Renteria | |
| 2022/0041510 | A1 | 2/2022 | Flores Renteria | |
| 2022/0371966 | A1 | 11/2022 | Flores Renteria | |

FOREIGN PATENT DOCUMENTS

| | | | | |
|---|---|---|---|---|
| DE | 102017005800 | A1 * | 12/2018 | C23C 4/11 |
| DE | 102017223879 | A1 | 7/2019 | |
| DE | 102018221940 | A1 * | 6/2020 | C23C 4/134 |
| EP | 0825271 | A1 | 2/1998 | |
| KR | 20200040231 | A | 4/2020 | |
| WO | 2019174836 | A1 | 9/2019 | |
| WO | 2021093999 | A1 | 5/2021 | |

OTHER PUBLICATIONS

PCT International Search Report and Written Opinion of International Searching Authority mailed May 6, 2022 corresponding to PCT International Application No. PCT/EP2022/050634 filed Jan. 13, 2022.

Saint-Gobain Zirpro; CY3Z-M grades; Technical Data Sheet; Feb. 2017; www.zirpro.com; China.

Dong, Chen et al: "Microstructure, thermal characteristics, and thermal cycling behavior of the ternary rare earth oxides (La2O3, Gd2O3, and Yb2O3) co-doped YSZ coatings"; Surface and Coatings Technology; Elsevier; vol. 403 (2020); 126387; XP086355376; ISSN: 0257-8972; DOI: 10.1016/J.SURFCOAT.2020.

* cited by examiner

CERAMIC MATERIAL, POWDER AND LAYER SYSTEM

CROSS REFERENCE TO RELATED APPLICATIONS

This application is the US National Stage of International Application No. PCT/EP2022/050634 filed 13 Jan. 2022, and claims the benefit thereof, which is incorporated by reference herein in its entirety. The International Application claims the benefit of German Application No. DE 10 2021 201 565.4 filed 18 Feb. 2021.

FIELD OF INVENTION

The invention relates to a ceramic material and to a powder which can be used for ceramic layer systems.

BACKGROUND OF INVENTION

Ceramics in general have a high thermal stability and are therefore often used as ceramic coatings on high-temperature components, such as for turbines, particularly for gas turbines.

The constant aim is to improve the heat insulation properties of the ceramic material.

SUMMARY OF INVENTION

It is therefore an object of the invention to achieve the object stated above.

The object is achieved by a ceramic material as claimed, a ceramic powder as claimed, and a layer system as claimed.

Ceramic layers based on zirconium oxide with stabilizers are known; here, stabilized or fully stabilized zirconium oxide is often used, owing to its better thermal stability.

The goal of the concept, however, is to use partially stabilized zirconium oxide having an improved stability, particularly thermal stability, specifically a ceramic material based on zirconium oxide ($ZrO_2$), comprising:

1.0 wt % to 8.0 wt % of base stabilizers:
particularly with 2.0 wt % to 8.0 wt % of base stabilizers:
yttrium oxide ($Y_2O_3$), and/or hafnium oxide ($HfO_2$),
wherein at least yttrium oxide ($Y_2O_3$) is used,
and also
at least one of the additional stabilizers:
erbium oxide ($Er_2O_3$) and/or ytterbium oxide ($Yb_2O_3$)
with a fraction of 0.2 wt % to 20.0 wt %,
particularly with 1.0 wt % to 10.0 wt %,
very particularly with 2.0 wt % to 9.0 wt %,
and also in each case optionally
aluminum oxide ($Al_2O_3$) 0.1%-2.0%,
and allowed impurity levels (in each case max.):

| | |
|---|---|
| calcium oxide (CaO) | 0.1%-0.2%, |
| iron oxide ($Fe_2O_3$) | 0.1%-0.2%, |
| magnesium oxide (MgO) | 0.1%-0.2%, |
| silicon oxide ($SiO_2$) | 0.1%-0.3%, |
| titanium oxide ($TiO_2$) | 0.1%-0.2%. |

Preferably, yttrium oxide ($Y_2O_3$) and hafnium oxide ($HfO_2$) are used as base stabilizers. It is also possible for only yttrium oxide ($Y_2O_3$) to be used as base stabilizer.

The ceramic material comprises preferably 2.5 wt % to 5.5 wt % of yttrium oxide ($Y_2O_3$), particularly 3.0 wt % to 5.0 wt % of yttrium oxide ($Y_2O_3$), very particularly 3.5 wt % to 4.0 wt % of yttrium oxide ($Y_2O_3$), to achieve good phase stability.

The ceramic material also comprises preferably hafnium oxide ($HfO_2$)>2.0 wt % to 4.0 wt %, particularly 2.2 wt % to 4.0 wt % of hafnium oxide ($HfO_2$), very particularly 2.4 wt % to 3.0 wt % of hafnium oxide ($HfO_2$).

Also advantageous is a ceramic material wherein the hafnium oxide ($HfO_2$) content is 0.2 wt % to <2.0 wt %, particularly 0.2 wt % to 1.8 wt % of hafnium oxide ($HfO_2$), very particularly 0.2 wt % to 1.6 wt % of hafnium oxide ($HfO_2$).

Secondary particles such as aluminum oxide ($Al_2O_3$) may be present with a fraction of 0.2 wt % to 1.5 wt % of aluminum oxide ($Al_2O_3$), particularly of 0.2 wt % to 1.2 wt %.

The fraction of aluminum oxide ($Al_2O_3$) may also be 1.5 wt % to 3.0 wt % of aluminum oxide ($Al_2O_3$) as well, particularly >2.0 wt % to 2.5 wt % of aluminum oxide ($Al_2O_3$).

As additional stabilizers, preferably only ytterbium oxide ($Yb_2O_3$) is used.

Other advantageous variants are, as additional stabilizers, only erbium oxide ($Er_2O_3$), or that as additional stabilizers only ytterbium oxide ($Yb_2O_3$) and erbium oxide ($Er_2O_3$) are connected.

Advantageous compositions are therefore $ZrO_2$—$HfO_2$—$Y_2O_3$—$Yb_2O_3$ or else $ZrO_2$—$HfO_2$—$Y_2O_3$—$Yb_2O_3$—$Al_2O_3$.

The weights of the additional stabilizers are preferably 5.5 wt % to 8.5 wt % of ytterbium oxide ($Yb_2O_3$), particularly 6.0 wt % to 8.0 wt % of ytterbium oxide ($Yb_2O_3$), very particularly 6.5 wt % to 7.5 wt % of ytterbium oxide ($Yb_2O_3$), and, respectively, 2.0 wt % to 4.0 wt % of erbium oxide ($Er_2O_3$), particularly 2.5 wt % to 3.5 wt % of erbium oxide ($Er_2O_3$).

For the fractions among one another, the following is valid particularly:

(8.0−x) wt % of $Y_2O_3$+(2-4)x wt % of $Yb_2O_3$/$Er_2O_3$,
particularly (6.0−x) wt % of $Y_2O_3$+(2-4)x wt % of $Yb_2O_3$/$Er_2O_3$,
where x represents the weight fraction of the additional stabilizers.

A ceramic powder comprises, more particularly consists of, a composition of a material according to listings above, with or without binder.

One advantageous layer system comprises a metallic substrate, optionally a metallic adhesion promoter layer, and at least one ceramic layer on the basis of the ceramic material of the invention.

A metallic adhesion promoter layer between the ceramic layer and the metallic substrate, particularly on the basis of NiCoCrAlY, serves for advantageous adhesion.

A ceramic sublayer (not the TGO) below the ceramic layer composed of a ceramic material is at least 20% thinner in configuration and comprises preferably 8YSZ, i.e., zirconium oxide stabilized with 3 mol % to 4 mol % of yttrium.

Yttrium oxide is used in any case as stabilizer.

This ceramic material may be produced as powder, and so there may be further additions present as when using abrasive layers which comprise cubic boron nitride or other abrasive particles.

DETAILED DESCRIPTION OF INVENTION

Figure 1:
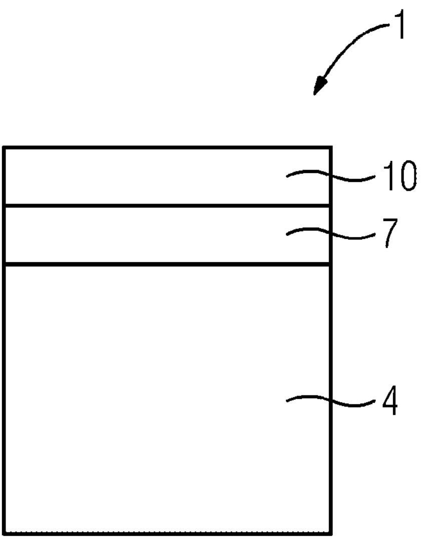
FIG. 1 shows an embodiment of a layer system.

In a layer system (FIG. 1), a ceramic layer 10 is applied to metal, and, in the case of preferably-used nickel or cobalt-based superalloys, a metallic adhesion layer 7 is present in-between, forming aluminum oxide.

The metallic adhesion promoter layer is preferably an aluminide, platinum aluminide or, as a basis, represents an NiCoCrAl layer.

The ceramic layer composed of the ceramic material may be produced by means of EB-PVD, plasma spraying (APS, . . . ), and has a columnar structure or a DVC (dense vertical cracked) structure.

The layer 10 has a preferential layer thickness of 100 μm to 1000 μm.

Figure 2:
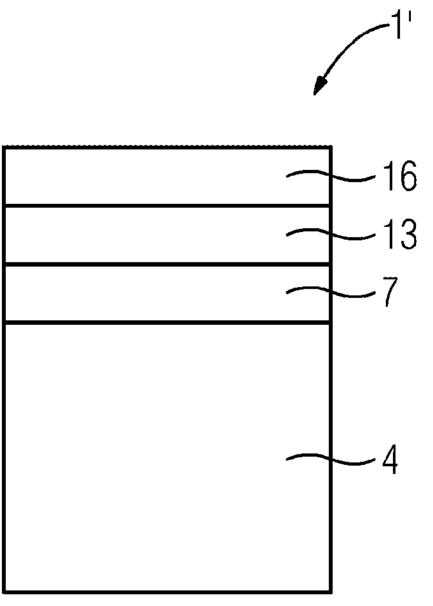
FIG. 2 shows another embodiment of a layer system.

As shown in FIG. 2, this ceramic layer 10 may also comprise a ceramic sublayer 13, which differs significantly from the ceramic layer 16, i.e. comprises no $Yb_2O_3$ and/or no $Er_2O_3$.

The layer thickness of the ceramic sublayer 13, however, is at least 20% thinner in configuration than that of the ceramic material of the invention in the ceramic layer 16.

The ceramic sublayer comprises 8YSZ, i.e., zirconium oxide stabilized with 3 mol % to 4 mol % of yttrium.

The invention claimed is:

1. A ceramic material based on zirconium oxide ($ZrO_2$), comprising (in wt %):

up to 8.0 wt % of base stabilizers, the base stabilizers comprising:

at least 2.5 wt % yttrium oxide ($Y_2O_3$), and optionally hafnium oxide (HfO2), additional stabilizers comprising:

erbium oxide ($Er_2O_3$) and/or ytterbium oxide ($Yb_2O_3$) with a fraction of 0.2 wt % to 20.0 wt %, further comprising:

aluminum oxide ($Al_2O_3$) 0.1%-3.0 wt % and further comprising allowed impurity levels:

| | |
|---|---|
| calcium oxide (CaO) | up to 0.2 wt%, |
| iron oxide ($Fe_2O_3$) | up to 0.2 wt%, |
| magnesium oxide (MgO) | up to 0.2 wt%, |
| silicon oxide ($SiO_2$) | up to 0.3 wt%, |
| titanium oxide ($TiO_2$) | up to 0.2 wt%. |

2. The ceramic material as claimed in claim 1, comprising the hafnium oxide ($HfO_2$).

3. The ceramic material as claimed in claim 1, wherein the yttrium oxide ($Y_2O_3$) is the only base stabilizer.

4. The ceramic material as claimed in claim 1, wherein the yttrium oxide ($Y_2O_3$) content is 2.5 wt % to 5.5 wt %.

5. The ceramic material as claimed in claim 1, comprising the hafnium oxide ($HfO_2$), wherein the hafnium oxide ($HfO_2$) content is >2.0 wt % to 4.0 wt %.

6. The ceramic material as claimed in claim 1, comprising the hafnium oxide ($HfO_2$), wherein the hafnium oxide ($HfO_2$) content is 0.2 wt % to <2.0 wt %.

7. The ceramic material as claimed in claim 1, wherein the aluminum oxide ($Al_2O_3$) content is 0.2 wt % to 1.5 wt %.

8. The ceramic material as claimed in claim 1, comprising wherein the aluminum oxide ($Al_2O_3$) content is 1.5 wt % to 3.0 wt %.

9. The ceramic material as claimed in claim 1, wherein the ytterbium oxide ($Yb_2O_3$) is the only additional stabilizer.

10. The ceramic material as claimed in claim 1, wherein the erbium oxide ($Er_2O_3$) is the only additional stabilizer.

11. The ceramic material as claimed in claim 1, which comprises as the additional stabilizers the ytterbium oxide ($Yb_2O_3$) and the erbium oxide ($Er_2O_3$).

12. The ceramic material as claimed in claim 1, consisting of

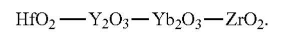

13. The ceramic material as claimed in claim 1, consisting of

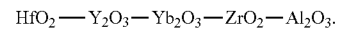

14. The ceramic material as claimed in claim 1, comprising the ytterbium oxide ($Yb_2O_3$), wherein the ytterbium oxide ($Yb_2O_3$) content is 5.5 wt % to 8.5 wt %.

15. The ceramic material as claimed in claim 1, comprising the erbium oxide ($Er_2O_3$), wherein the erbium oxide ($Er_2O_3$) content is 2.0 wt % to 4.0 wt %.

16. The ceramic material as claimed in claim 1, comprising the erbium oxide ($Er_2O_3$) and the ytterbium oxide ($Yb_2O_3$), comprising (8.0−x) wt % of $Y_2O_3$+[(2-4)*x] wt % of $Yb_2O_3/Er_2O_3$, and where x represents a weight fraction of the additional stabilizers.

17. A ceramic powder comprising, a composition of a material as claimed in claim 1.

18. A layer system at least comprising a metallic substrate, optionally a metallic adhesion promoter layer, and at least one ceramic layer comprising the ceramic material as claimed in claim 1.

19. The layer system as claimed in claim 18, comprising a NiCoCrAlY based metallic adhesion promoter layer between the ceramic layer and the metallic substrate, and optionally comprising silicon (Si), rhenium (Re) and/or tantalum (Ta).

20. The layer system as claimed in claim 18, wherein below the ceramic layer there is a ceramic sublayer comprising the ceramic material, which is at least 20% thinner in configuration.

* * * * *